United States Patent [19]

Onuma et al.

[11] Patent Number: 5,287,173
[45] Date of Patent: Feb. 15, 1994

[54] SYSTEM AND METHOD FOR ADJUSTING WHITE BALANCE OF PROJECTOR TYPE COLOR DISPLAY DEVICE

[75] Inventors: Hideki Onuma, Kanagawa; Shigeto Funado, Saitama, both of Japan

[73] Assignee: Sony Corporation, Tokyo, Japan

[21] Appl. No.: 978,367

[22] Filed: Nov. 18, 1992

[30] Foreign Application Priority Data

Nov. 18, 1991 [JP] Japan ................................ 3-301915

[51] Int. Cl.$^5$ .................... H04N 9/73; H04N 9/74; H04N 9/31
[52] U.S. Cl. .................................. 348/655; 348/776; 348/744
[58] Field of Search ............. 358/29, 60, 64, 72, 358/74; 353/30-31, 69; H04N 9/73, 9/74, 9/31

[56] References Cited

U.S. PATENT DOCUMENTS

| | | | |
|---|---|---|---|
| 4,599,642 | 7/1986 | Willis | 358/65 |
| 4,746,970 | 6/1988 | Hosokawa et al. | 358/64 |
| 5,181,103 | 1/1993 | Aoyama | 358/60 |

Primary Examiner—James J. Groody
Assistant Examiner—Glenton B. Burgess
Attorney, Agent, or Firm—Hill, Steadman & Simpson

[57] ABSTRACT

A system for adjusting the white balance of a projector type color display device is shown. The color display device includes three single color cathode ray tubes from which single color beams are projected onto a screen to form a colored image on the screen. The white balance adjusting system comprises a first device for feeding one of the three cathode ray tubes with all white signal to cause the same to project a single color image on the screen; a second device for detecting a luminance value of the single color image on the screen; a third device for deriving luminance values of the other single color images from the detected luminance value; and a fourth device for controlling the selected cathode ray tube in such a manner that the derived luminance values are put in a tolerance which is provided for dealing with a noise of the second device.

13 Claims, 3 Drawing Sheets

SYSTEM AND METHOD FOR ADJUSTING WHITE BALANCE OF PROJECTOR TYPE COLOR DISPLAY DEVICE

BACKGROUND OF THE INVENTION

1. Field of the Invention

The present invention relates to a system and a method for adjusting the white balance of a projector type color display device.

2. Description of the Prior art

In color projectors (viz., projector type display devices), "white balance adjustment" is usually carried out at the time when the projectors are still in a manufacturing line and/or they are brought to a user's setting place. As is known, by properly adjusting the white balance of the color projector, the color image on the screen can have a natural color tone. However, in the color projectors of a type wherein images on display surfaces of three (viz., Red, Green and Blue) color display TV tubes are projected onto a screen to form a colored image thereon, the white or color balance of the projector is easily out of tune due to complicated arrangement of the three display TV tubes. Thus, in the color projectors of such type, the white balance adjustment is always necessary when the setting place and setting orientation of the projector change. Furthermore, such white balance adjustment becomes necessary when the projectors are used for a long time.

Hitherto, the white balance adjustment at the manufacturing line has been made by using color sensors. That is, the color sensors are manually attached to the display faces of the three display tubes for sensing the colors displayed on the display faces. All white signals (such as 5IRE signal and 100IRE signal) are fed to each display tube as an external signal, and the white balance adjustment of the color projector is carried out with reference to the information signals issued from the color sensors. One of the methods of this type is described in Japanese Patent First Provisional Publication 3-236699.

The white balance adjustment at the user side has been made by using a colorimeter and a color-difference meter. That is, the adjustment has been made manually by an inspector who compares, with his or her eyes, the color image on the screen and the reference color data provided by the colorimeter and the color difference meter.

However, it is difficult or at least troublesome to adjust the white balance by using the above-mentioned conventional adjusting methods. In fact, attaching and detaching the color sensors to and from the display tubes on the manufacturing line are troublesome. This becomes much more severe when a plurality of stackable color display devices, which are used for forming a so-called "multiscreen", are subjected to the white balance adjustment. Furthermore, the white balance adjustment by using the colorimeter and the color-difference meter requires a great deal of skill.

SUMMARY OF THE INVENTION

It is therefore an object of the present invention to provide a system and a method for adjusting the white balance of a projector type color display device, which are free of the above-mentioned drawbacks.

According to a first aspect of the present invention, there is provided a system for adjusting the white balance of a projector type color display device which includes three single color cathode ray tubes from which single color beams are projected onto a screen to form a colored image on the screen. The white balance adjusting system comprises first means for feeding one of the three cathode ray tubes with an all white signal to cause the same to project a single color image on the screen; second means for detecting a luminance value of the single color image on the screen; third means for deriving luminance values of the other single color images from the detected luminance value; and fourth means for controlling the selected cathode ray tube in such a manner that the derived luminance values are put in a tolerance which is provided for dealing with a noise of the second means.

According to a second aspect of the present invention, there is provided a method for adjusting the white balance of a projector type color display device which includes three single color cathode ray tubes from which single color beams are projected onto a screen to form a colored image on the screen. The method comprises (a) feeding one of the three cathode ray tubes with an all white signal to cause the same to project a single color image on the screen; (b) detecting a luminance value of the single color image on the screen; (c) deriving luminance values of the other single color images from the detected luminance value; (d) controlling the selected cathode ray tube in such a manner that the derived luminance values are put into a tolerance which is provided for dealing with a noise which is inevitably produced when the step (b) is carried out; and (e) repeating the steps (a), (b), (c) and (e) on the other two cathode ray tubes.

According to a third aspect of the present invention, there is provided a method for adjusting the white balance of a plurality of projector type color display devices, each device including three single color cathode ray tubes from which single color beams are projected onto a screen to form a colored image on the screen. The method comprises (a) preparing a reference color display device whose white balance has been already adjusted; (b) feeding one of the three cathode ray tubes of the reference color display device with an all white signal to cause the same to project a single color image on the screen; (c) detecting a luminance value of the single color image on the screen; (d) repeating the steps (b) and (c) on the other two cathode ray tubes of the reference color display device thereby to respectively provide reference luminance values of the three cathode ray tubes of the reference color display device; (e) detecting luminance values of three single color images on the screen, which images are provided by the three cathode ray tubes of one of the plural color display devices to be adjusted; (f) controlling the gain and the bias of the selected color display device in such a manner that the detected luminance values are controlled to the reference luminance values; and (g) repeating the steps of (e) and (f) on the remaining color display devices.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
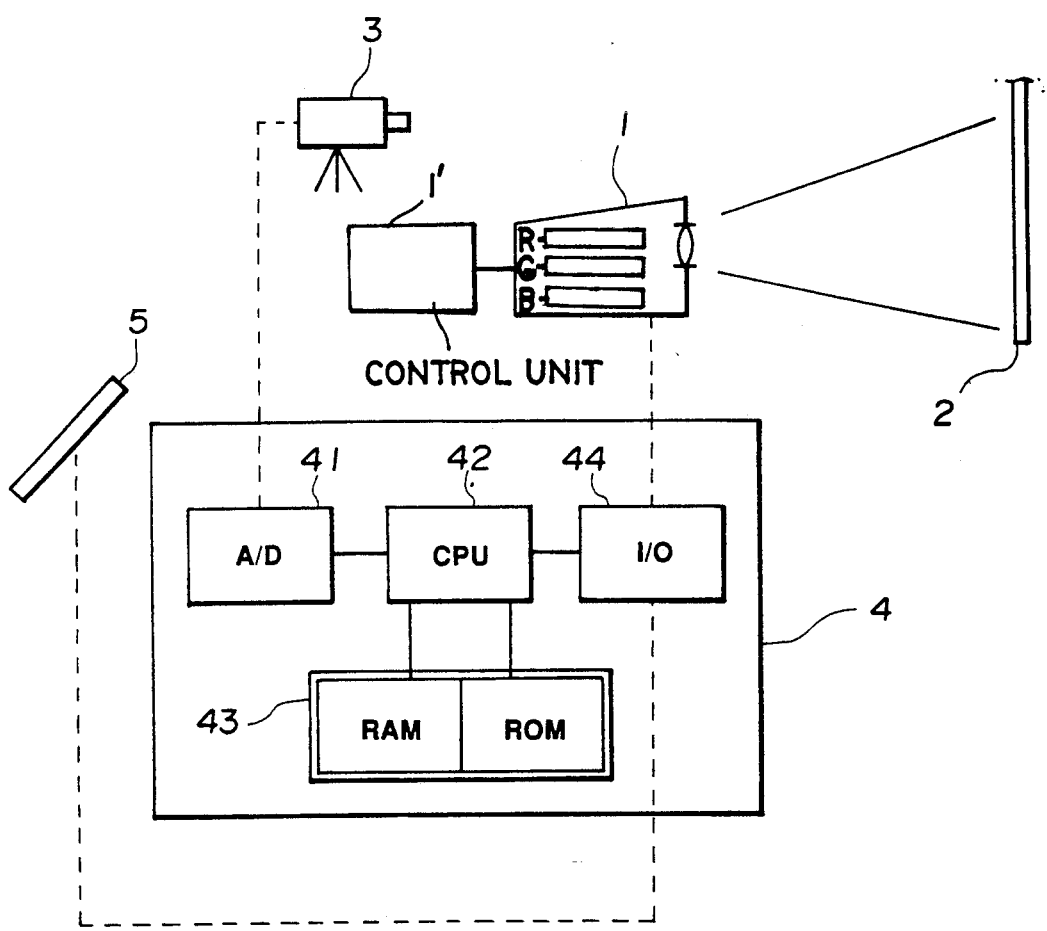
FIG. 1 is a simplified block diagram of a white balance adjusting system for a projector type color display device, which is made in accordance with the present invention.

Referring to FIG. 1, there is shown a block diagram of a system for adjusting the white balance of one color projector, which is made in accordance with the present invention.

In the drawing, denoted by numeral 1 is the color projector whose white-balance is to be adjusted, 2 is a screen onto which a color image from the projector 1 is projected, and 3 is a black-and-white CCD (charged coupled device) camera which is arranged to face the screen 2.

Designated by numeral 4 is a projector auto-set up control unit and 5 is a commander. The control unit 4 is a microcomputer which comprises an A/D (analog/digital) converter section 41, a CPU (central processing unit) section 42, a RAM and ROM section 43 and an I/O (input/output) section 44.

The projector 1 comprises three (viz., Red, Green and Blue) high intensity cathode ray tubes R, G, B (viz., CRTS) from which respective (viz., Red, Green and blue) brilliant color beams are projected forward onto the screen 2 to form a colored image on the screen 2.

As will be described in detail hereinafter, given a requirement for white balance adjustment of the color projector 1, at first only one (for example, Green) cathode ray tube is energized by a white balance control unit 11 and an all white signal of a H/L (high-light) side is fed to the Green cathode ray tube. Thus, the Green cathode ray tube projects a green color image (that is, the green component of the all white signal of the H/L side) on the screen 2. In response to an instruction signal from the control unit 4, the black-and-white CCD camera 3 takes or detects the luminance (or brightness) of the green color image on the screen 2. The analog signal from the CCD camera 3 is converted into a digital type by the A/D converter 41 and fed to the CPU 42. Then an all white signal of a C/O (cut-off) side is fed to the Green cathode ray tube to cause the same to project another green color image (that is, the green component of all white signal of the C/O side) on the screen 2. The CCD camera 3 detects the luminance value of this green color image on the screen 2 to feed the control unit 4 with information on the luminance value. The CPU 42 of the control unit 4 treats the luminance representing data from the CCD camera 3 with reference to predetermined reference data stored in the memory section 43 to provide a display means of the commander 5 with information which is needed for adjusting the Green cathode ray tube of the color projector 1. With reference to the information thus displayed on the commander 5, an operator manipulates gain and bias of the Green cathode ray tube.

Then, a similar manipulation is applied to the other two (Red and Blue) cathode ray tubes for adjusting the white balance of these cathode ray tubes.

With these steps, the white balance adjustment of the color projector 1 is completed.

The method for adjusting the white balance of the color projector 1 will be much more clearly understood from the following description.

Figure 2:
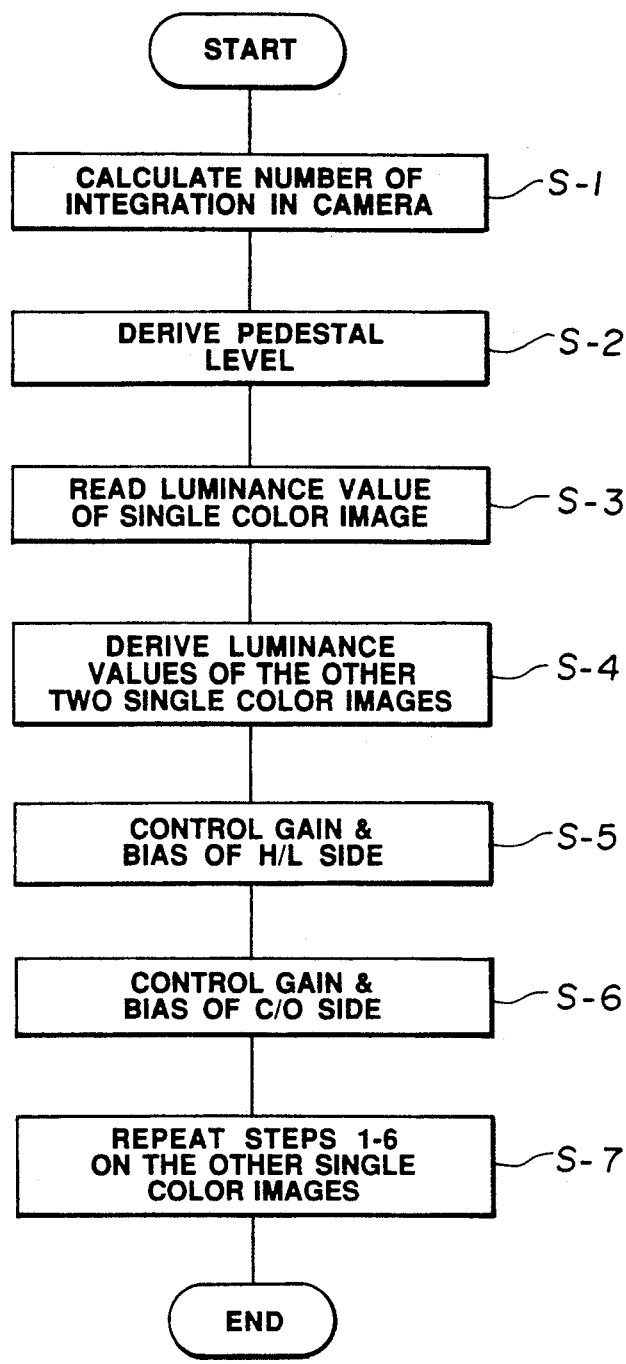
FIG. 2 is a flowchart showing operation steps conducted in the system of FIG. 1 for adjusting the white balance of one color projector.

Referring to FIG. 2, there is shown a flowchart which depicts the steps for adjusting the white balance of the color projector 1.

The ROM of the control unit 4 has previously memorized reference luminance ratios between Green, Red and Blue color images on the screen 2 based on three reference color temperatures which are, for example, 6500° K., 3200° K. and 9300° K.

The CCD camera 3 has an integration function to deal with a dark picture on the screen 2.

In the flowchart, at step S-1, the number of integration in the CCD camera 3 on the H/L side and that on the C/0 side are both calculated in accordance with the luminance values of single color (viz., green) images on the screen 2, which images have the color temperature of 6500° K. As is described hereinabove, the two types of single (viz., green) color images are provided by feeding the Green cathode ray tube with an all white signal of the H/L and C/O sides. Then, at step S-2, the pedestal level of the single color image (viz., the blanking level of the image signal produced when the screen 2 does not provide any luminous image thereon) is derived. Then, at step S-3, the luminance value of the single (viz., green) color image on the screen 2 is read for each of the "H/L" and "C/O" sides. At step S-4, the luminance values of the other two (viz., Red and Blue) color images are derived from the just read luminance value of "Green" in view of the previously memorized luminance ratio between "G", "R" and "B" of the color temperature of 6500° K. At steps S-5 and S-6, by controlling the gain and the bias of the Green cathode ray tube, the tracking of the "H/L" side and that of the "C/O" side are adjusted so that the derived luminance values of the two color images "B" and "R" are brought onto or hidden by a tolerance which is provided for dealing with the noise of CCD camera 3. With this, adjustment of the Green cathode ray tube is achieved.

Then, similar steps are carried out on the other two (viz., red and blue) color images on the screen 2, which images have the color temperature of 3200° K. and 9300° K. These color images are provided by feeding the Red and Blue cathode ray tubes with an all white signal of the H/L and C/O sides. When operation steps corresponding to the above-mentioned steps S-5 and S-6 are finished, adjustment of the Red and Blue cathode ray tubes is completed, and thus, the white balance of the color projector 1 is completed.

Figure 3:
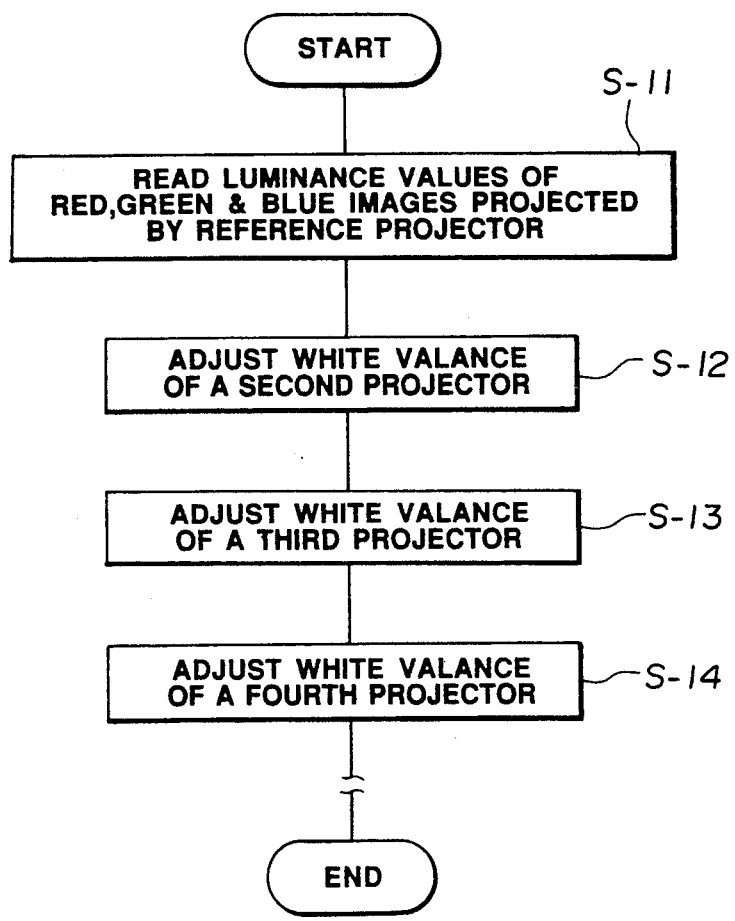
FIG. 3 is a flowchart showing operation steps conducted for adjusting the white balance of a plurality of color projectors.

Referring to FIG. 3, there is shown another flowchart which depicts the steps for adjusting the white balance of a plurality of color projectors.

In order to carry out this adjustment, a reference or first projector 1 is prepared, whose white balance has been already adjusted in the above-mentioned manner.

At step S-11, the luminance values of the reference colors "IR", "G" and "B" of the first projector 1 are detected on both the "H/L" and "C/O" sides. That is, at first, one of the Red, Green and Blue cathode ray tubes is energized and fed with an all white signal of H/L and C/O sides. With this, the selected cathode ray tube projects one color image on the screen 2. The luminance value of the color image is detected by the black-and-white CCD camera 3. A similar operation is carried out on the other two cathode ray tubes to detect the luminance values of the other two color images.

With these steps, six reference luminance values "RH1", "GH1", "BH1", "RC1", "GC1" and "BC1" of the reference projector 1 are provided.

Then, at step S-12, by controlling gain and bias of each cathode ray tube of a second projector 1' which is to be adjusted, the tracking of the "H/L" side and that of the "C/O" side are adjusted in such a manner that the luminance values "RH1-2-", "GH1-2", "BH1-2", "RC1-2", "GC1-2" and "BC1-2" of this second projector 1' are the same as the reference luminance values "RH1", "GH1", "BH1", "RC1", "GC1" and "BC1", of the reference or first projector 1.

At steps S-13 and S-14, a similar operation is carried out for adjusting the white balance of third and fourth projectors 1" and 1'''.

With these steps, adjustment of the white balance of the second, third and fourth projectors 1', 1" and 1''' and more can be readily carried out by using only the data of the first or reference projector 1.

In the aforementioned embodiments, a black-and-white type CCD camera 3 is used. However, if desired, a color type CCD camera may be used. In this case, all of the three cathode ray tubes project their single color images onto the screen 2 at the same time to form an all white image on the screen 2, and the color CCD camera detects the luminance values of the Green, Red and Blue color components of the all white image at the same time.

Although various minor changes and modifications might be suggested by those skilled in the art, it will be understood that we wish to include within the claims of the patent warranted hereon all such changes and modifications as reasonably come within our contribution to the art.

What is claimed is:

1. A system for adjusting white balance of a projector type color display device which includes three single color chathode ray tubes from which single color beams are projected onto a screen to form a colored image on the screen, comprising:
    first means for feeding a selected one of the three cathode ray tubes with an all white signal to cause the selected cathode ray tube to project a single color image on said screen;
    second means for detecting a luminance value of said single color image on said screen;
    third means for storing reference luminance ratios based on three reference color temperatures between three respective color images projected on the screen when the three color tubes are turned on individually;
    fourth means for deriving luminance values of the other two single color images from the detected luminance value and said stored luminance ratios; and
    fifth means for controlling the selected cathode ray tube in such a manner that the derived luminance values of the other single color images are put in a tolerance which is provided for dealing with a noise of said second means.

2. A system according to claim 1 in which said first means feeds the selected cathode ray tube with both an all white signal in a region of high-light and an all white signal in a region of cut-off.

3. A system according to claim 1 in which said second means comprises a black and white CCD camera.

4. A system according to claim 1 wherein said second means comprises a color CCD camera.

5. A system according to claim 1 in which said third means for storing and said fourth means for deriving comprises a computer, and said three color images comprise green, red, and blue, respectively.

6. A system according to claim 1 in which said second means comprises a CCD camera arranged to face towards said screen.

7. A system according to claim 1 further comprising a display means for displaying information needed for adjusting gain and bias of said selected cathode ray tube.

8. A system according to claim 1 wherein said fifth means for controlling the selected cathode ray tube adjusts gain and bias of the selected cathode ray tube.

9. A method for adjusting white balance of a projector type color display device which includes three single color cathode ray tubes from which single color beams are projected onto a screen to form a colored image on the screen, comprising the steps of:
    (a) storing reference luminance ratios based on three reference color temperatures between three respective single color images projected on the screen when the three color tubes are turned on individually;
    (b) feeding the selected one of the three cathode ray tubes with an all white signal to cause the selected cathode ray tube to project a single color image on said screen;
    (c) detecting a luminance value of said single color image on said screen;
    (d) deriving luminance values of the other two single color images from the detected luminance value and said stored luminance ratios;
    (e) controlling the selected cathode ray tube in such a manner that the derived luminance values of the other single color images are put in a tolerance which is provided for dealing with a noise which is produced when detecting said luminance value of said single color image on said screen; and
    (f) repeating steps (b), (c), (d), and (e) on the other two cathode ray tubes.

10. A method according to claim 9 including the step of detecting said luminance value in step (b) by use of a black and white CCD camera.

11. A method according to claim 9 including the step of providing said three color images as green, red, and blue, respectively.

12. A method for adjusting white balance of a plurality of projector type color display devices, each device including three single color cathode ray tubes from which single color beams are projected onto a screen to form a colored image on the screen, comprising the steps of:
    (a) providing a reference color display device whose white balance has been already adjusted;
    (b) feeding a selected one of said three cathode ray tubes of said reference color display device with an all white signal to cause the selected cathode ray tube to project a single color image on said screen;
    (c) detecting a luminance value of said single color image on said screen;
    (d) repeating steps (b) and (c) on the other two cathode ray tubes of said reference color display device to respectively provide reference luminance values of the three cathode ray tubes of the reference color display device;
    (e) detecting luminance values of three single color images on the screen provided by three cathode ray tubes of a selected one of said plurality of color display devices to be adjusted;

(f) controlling gain and bias of said selected color display device in such a manner that the detected luminance values are controlled to the reference luminance values; and (g) repeating steps (e) and (f) on another of the remaining color display devices until all the color display devices have been controlled.

13. A method according to claim 12 including the further step of providing the color display devices in a stacked multi-screen arrangement.

* * * * *